SIGNAL COMPARISON DEVICE UTILIZING TRANSISTORS

Filed Sept. 23, 1960 2 Sheets-Sheet 1

INVENTOR.
DAVID F. HOESCHELE, JR.
BY
Francis A. Varallo
AGENT

Nov. 3, 1964 D. F. HOESCHELE, JR 3,155,840

SIGNAL COMPARISON DEVICE UTILIZING TRANSISTORS

Filed Sept. 23, 1960 2 Sheets-Sheet 2

INVENTOR.
DAVID F. HOESCHELE, JR

BY Francis A. Varallo
AGENT 3,155,840

SIGNAL COMPARISON DEVICE UTILIZING TRANSISTORS

David F. Hoeschele, Jr., Willow Grove, Pa., assignor to Burroughs Corporation, Detroit, Mich., a corporation of Michigan Filed Sept. 23, 1960, Ser. No. 58,132
11 Claims. (Cl. 307—88.5)

This invention relates generally to voltage and current sensing devices and more particularly to a solid-state electronic differential detector.

Electronic circuits for detecting differences in the respective amplitudes of an input signal voltage and a reference potential are well known in the electronics art. These circuits, often referred to simply as differential detectors, find particular application in the data processing, computing and control fields. One such differential detector which has been used extensively is the familiar Schmitt trigger circuit. Basically the Schmitt trigger is a two-stage amplifier whose output voltage is always at either one of two D.C. levels depending upon the magnitude and past history of the input signal.

The detector circuit of the present invention is similar in function to the Schmitt trigger in that its output voltage is at either one of two levels depending upon the comparative amplitudes of the input signal and a preselected reference potential. A significant advantage of the present invention over the Schmitt trigger is the accuracy with which the detection point may be selected, i.e., the selection of the magnitude of the input signal voltage at which the detector output potential shifts from one level to the other. Other features of the instant invention include the increased stability of the detection point with time and temperature and the greater circuit sensitivity which results from the much smaller difference in the input signal voltage required to insure the proper shifting in the output levels of the detector.

Accordingly it is a general object of the present invention to provide an improved differential detector.

Another object of this invention is to provide a differential detector which utilizes exclusively solid-state electronic components.

Another object of this invention is to provide a differential detector in which the detection point may be easily and accurately selected.

A further object of the present invention is to provide a differential detector in which the detection point is stable with respect to time and temperature.

A still further object of the invention is to provide a differential detector having output voltages standardized to two distinct levels that are compatible with those employed in associated electronic circuits.

A still further object of this invention is to provide a differential detector having increased sensitivity and speeds of detection.

These and other objects are realized in an illustrative embodiment of this invention which comprises a plurality of transistors, all but one being of the same conductivity type. A pair of these transistors perform the actual detecting of the voltage difference—the input signal being applied to an input electrode of one of these transistors and the reference potential being applied to an input electrode of the other of said pair of transistors. A third transistor is connected to an output electrode of each of said pair of transistors and serves to amplify the difference in the potential appearing across said output electrodes. A fourth transistor, of a conductivity type opposite to that of the other transistors, responds to the state of conduction of the third transistor and provides the appropriate output voltage level.

In accordance with an aspect of this invention, positive feedback may be added to the basic circuit to preclude the possibility of having output potentials of non-standard amplitude for certain small ranges of the input voltage, which may be unsatisfactory in some applications. Further, in accordance with another aspect of the invention, unidirectional current paths may be provided in appropriate portions of the differential detector to materially increase the speed of response of detection in applications where the higher response is desirable.

A complete understanding of this invention and the objects and features thereof may be gained from the following description and annexed drawings, in which.

Figure 1:
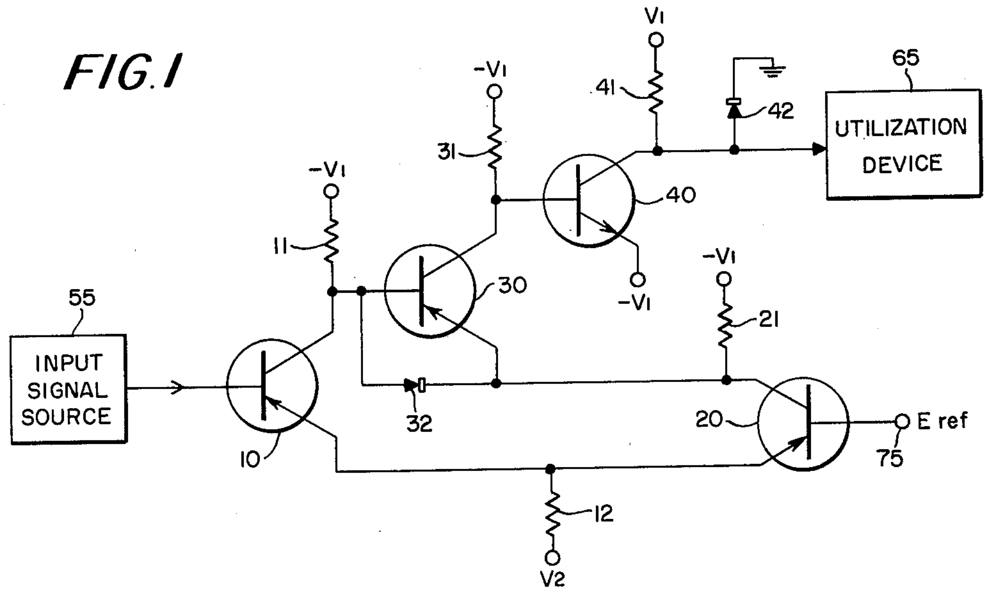
FIG. 1 is a schematic representation of the basic embodiment of the differential detector of the instant invention.

Before proceeding with a detailed description of the invention, it should be noted that conventional graphical symbols have been employed to designate the emitter, collector and base electrodes of each of the transistors. However, the invention is restricted neither to the types of transistors depicted, nor to the use of the transistors themselves, but may employ other types of transistors or current amplifying devices in accordance with established design procedures well known to those skilled in the art. The positive and negative supply of voltages for the transistors listed respectively in order of increasing absolute magnitude are $V_1$, $V_2$ and $-V_1$. Like reference numerals have been used in the drawing to identify similar components.

Referring now to the basic circuit depicted in FIG. 1, there are shown three PNP transistors, 10, 20 and 30 and an NPN transistor 40. The actual detection is performed by transistors 10 and 20. The reference potential $E_{ref}$ is applied via terminal 75 to the base electrode of transistor 20. The input signal to be compared to the reference voltage is applied to the base of transistor 10. The emitter electrodes of transistors 10 and 20 are connected in common to a source of potential $V_2$ by way of resistor 12. The collector electrodes of transistors 10 and 20 are connected respectively to the base and emitter electrodes of transistor 30. A unidirectional current conducting device, diode 32, is connected between the base and emitter of transistor 30. The collectors of transistors 10 and 20 are also connected to a source of potential $-V_1$ by resistors 11 and 21 respectively. The collector of transistor 30 is connected both to a source of potential $-V_1$ by way of resistor 31 and to the base electrode of transistor 40. The emitter of transistor 30 is likewise connected to source $-V_1$. The collector of transistor 40 is connected to a source of positive potential $V_1$ by resistor 41 and to a utilization device 65. A clamping diode 42 is also connected to the collector of transistor 40.

The operation of the circuit of FIG. 1 will now be described in detail. This circuit is adapted to deliver a predetermined output voltage level to the utilization device 65 whenever the amplitude of the input signal from source 55 exceeds the reference potential $E_{ref}$. If the amplitude of the input signal is equal to or less than $E_{ref}$, the detector output will be at a second voltage level.

It will be assumed initially that the input signal voltage applied to the base of transistor 10 is equal to the reference voltage, $E_{ref}$, applied to the base of transistor 20. Transistors 10 and 20 are biased to conduction because of the emitter potential from source $V_2$ which appears on their common emitter electrodes. Since the voltage appearing respectively on the bases of transistors 10 and 20 are equal, there are equal amplitudes of current flowing in each of the collector circuits of the latter transistors. Accordingly, the collector voltages of transistors 10 and 20 are equal. These collector voltages are applied respectively to the base and emitter electrodes of transistor 30 and bias this transistor to nonconduction. Under these conditions the collector electrode of transistor 30 is at the potential of the $-V_1$ supply, which potential appears on the base of transistor 40 and biases this transistor to nonconduction. The output voltage level on the collector of transistor 40 is equal to the voltage drop across diode 42, or more simply stated, this voltage level is clamped at ground potential.

In the case where the input voltage becomes more positive than $E_{ref}$, the degree of conduction of transistor 10 will be somewhat diminished, which in turn will cause the voltage on the common emitters of transistors 10 and 20 to go more positive. This positive-going potential on the emitter of transistor 20 results in the increased conduction thereof. The over-all effect of these changes in the conduction of transistors 10 and 20 is that the collector potential of transistor 20 becomes more positive than the collector potential of transistor 10. The potential difference of thes collector voltages appears across the base and emitter electrodes of transistor 30 and is sufficient to forward-bias this transistor to conduction. The positive-going collector voltage of transistor 30 biases transistor 40 to conduction and the collector of transistor 40 goes negative to approximately the amplitude of the $-V_1$ supply. This negative level, indicative of the fact that the input signal has become positive with respect to the $E_{ref}$ potential, is coupled to the utilization device 65.

If in a third case the input signal is more negative than $E_{ref}$, the conduction of transistor 10 will be increased and the negative-going voltage on the common emitters of transistors 10 and 20 result therefrom effects a diminution of the current flow through transistor 20 and eventually the back-biasing of this latter transistor to nonconduction. The increased conduction of transistor 10 and the corresponding decreased conduction of transistor 20 results in the biasing of transistor 30 to nonconduction. As previously described, transistor 40 is likewise biased to nonconduction. The output of the detector circuit is therefore at approximately ground potential. Summarily, for the circuit of FIG. 1, the output level is approximately ground potential whenever the input signal is equal to or less positive than the reference potential, and at the $-V_1$ potential when the input is more positive than the reference.

Diode 32 limits the back voltage across the base-to-emitter junction of transistor 30, and along with the base-to-emitter junction of transistor 30 limits the voltage swings on the collectors of transistors 10 and 20. This condition results in increased detection speeds and greater sensitivity without the danger of saturating transistors 10 and 20.

Figure 2:
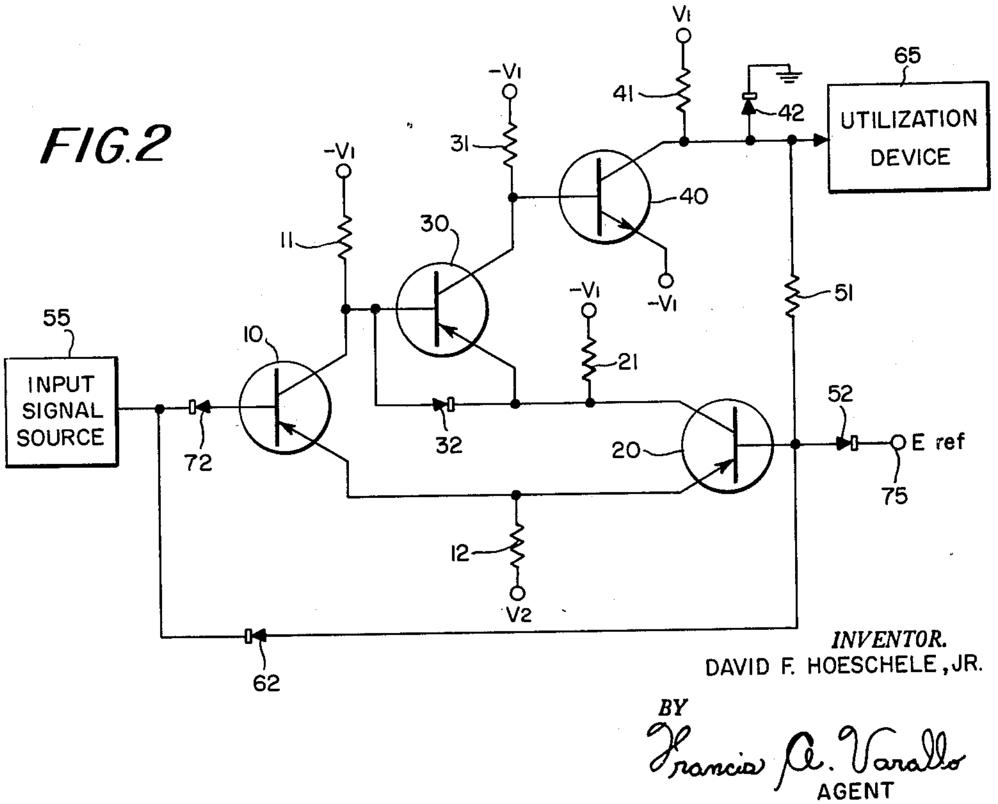
FIG. 2 is a schematic representation of a further embodiment of the present invention suitable in applications requiring faster detection response and unambiguous standardized output voltage levels.

The circuit of FIG. 2 is similar to that of FIG. 1 except that a portion of the output voltage appearing on the collector of transistor 40 is fed back to the base of transistor 20 by way of resistor 51. Also, diodes 62 and 72 which connect respectively the base of transistor 20 and transistor 10 to the signal source 55, and a third diode 52 which connects the base of transistor 20 to the reference potential, have been added to the circuit. The effects of these modifications on the circuit operation hereinbefore described will become apparent from the following considerations.

It should be noted that each of the modifications, namely the positive feedback or the unidirectional current paths provided by the diodes are distinct, independent additions to the circuit of FIG. 1. Therefore, depending upon the particular application of the detector, either, both or neither of the modifications may be desirable.

Considering first the function of the feedback resistor 51, it should be remembered that the circuit of FIG. 1 is designed to detect input voltages which are more positive than the reference voltage. The output voltage of this circuit goes negative when the input voltage changes from a level which is more negative than the reference voltage to a level more positive than the reference. During steady state operation, the detector produces an output voltage having either of two distinct levels. However during the transient period of change from one output voltage level to another, there is a small range of input voltage amplitudes where the magnitude of the output voltage lies between these distinct levels. This condition results from the fact that although transistor 40 has begun to conduct in response to the conduction of transistor 30, it has not received sufficient bias potential to cause it to attain its saturated condition. For many applications such a condition is innocuous but for others this may be undesirable.

The use of positive feedback in the detector circuit overcomes this difficulty. Therefore in the circuit of FIG. 2 the output voltage appearing on the collector electrode of transistor 40 is fed back to the base of transistor 20. When the input voltage becomes more positive than $E_{ref}$ and the output voltage level on the collector of transistor 40 begins to go negative, this negative potential is fed back to the base of transistor 20 thereby increasing the conduction thereof. This feedback voltage has the same effect on the detector operation as a positive-going change in the input signal. The increased conduction of transistor 20 results in a similar increase in the conduction of transistor 30. The end result is that transistor 40 becomes saturated and its collector voltage, which is the detector output level, assumes a distinct negative level substantially equal to the amplitude of the $-V_1$ supply.

Diodes 52, 62 and 72, depicted in FIG. 2, have been added to the circuit of FIG. 1 to increase the speed of response of detection when the input signal exceeds the reference. In order to accomplish this result, the diodes are arranged to keep both transistors 10 and 20 in the active or conductive state when the input signal is more negative than the reference potential. Thus in the circuit of FIG. 2 if the input signal is more negative than the reference, transistors 10 and 20 are biased to conduction and their respective base currents flow through diodes 72 and 62 to the input signal source 55. Since the bases of transistors 10 and 20 are at the same potential, both transistors have the same degree of conduction and there is no difference of potential between the base and emitter electrodes of transistor 30. Accordingly transistors 30 and 40 are OFF.

When the input signal becomes slightly more positive than $E_{ref}$, a point is reached at which diode 52 is sufficiently forward-biased to allow some base current of transistor 20 to flow therethrough. This means that the base of transistor 20 will not change in a positive direction to the same degree that the base of transistor 10 has changed. Stated in another way, initially transistor 10 follows the positive-going input signal closely but transistor 20 cannot follow in the same manner due to the initiation of conduction of diode 52. This means also that the emitter of transistor 20 and likewise the emitter of transistor 10 do not follow completely the positive-going input signal. The over-all result of this condition is a diminution of the forward bias on the base-to-emitter junction of transistor 10 and an increase in the forward bias on transistor 20. More current then flows in the collector circuit of transistor 20 and less collector current, in transistor 10. When the input signal goes sufficiently positive for the difference in potential between the respective collectors of transistors 10 and 20 to exceed the required forward bias on transistor 30, the detector circuit generates a negative-going output signal, as previously explained.

As the input signal continues to go more positive a point is reached where diode 72 and the base-to-emitter junction of transistor 10 do not have sufficient forward bias to sustain the conduction thereof. This occurs because the common emitters of transistors 10 and 20 have remained at a substantially constant potential approximately equal to $E_{ref}$. A further increase in the positive input signal back-biases diodes 62 and 72 and the base-to-emitter junction of transistor 10. However it should be remembered that the detector circuit has already generated an output signal long prior to the establishment of such back-biases—hence the increased speed of detection which is not dependent upon the turning ON or OFF of the detecting transistors.

Figure 3:
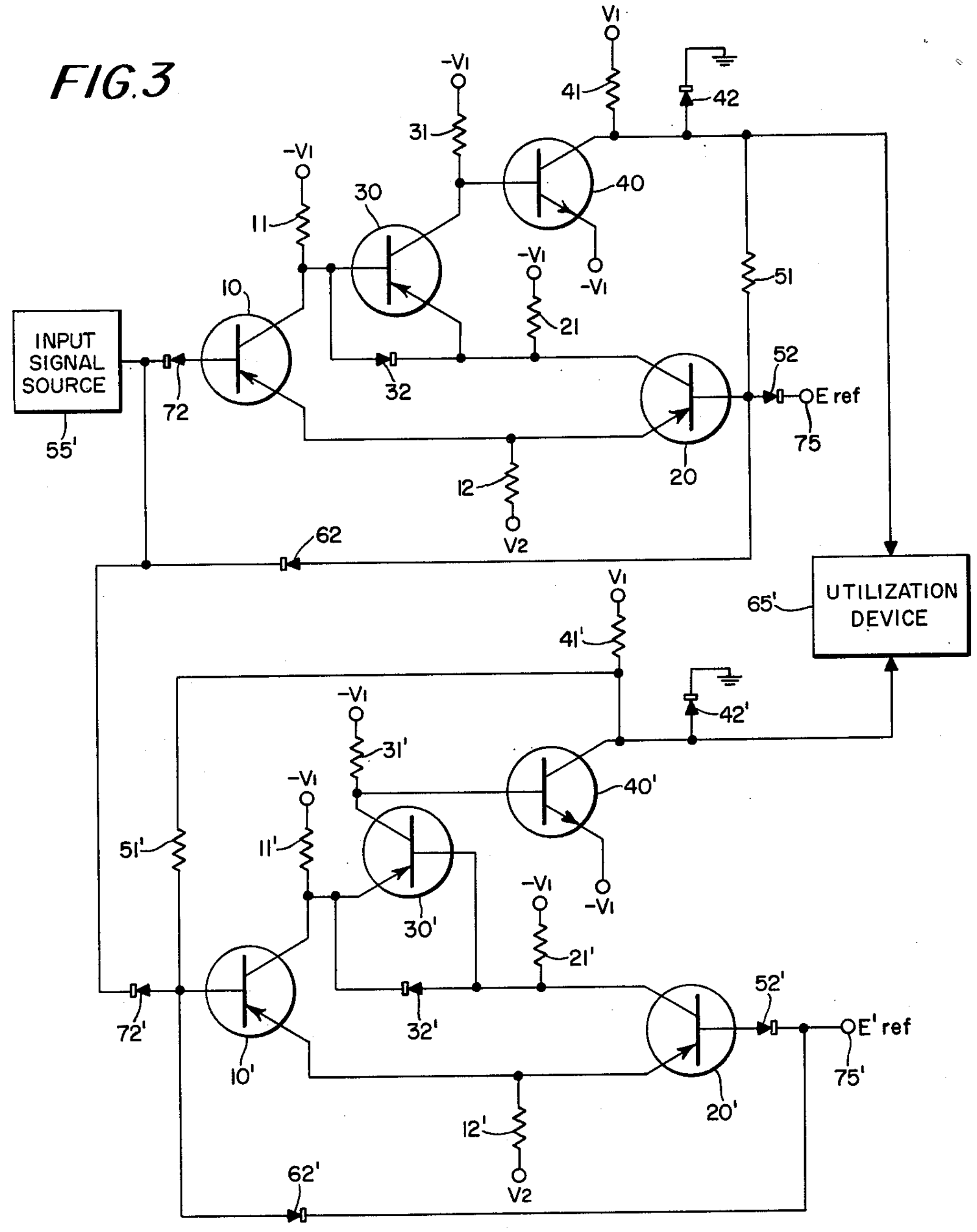
FIG. 3 is a schematic representation of a still further embodiment of the present invention in a system for detecting the presence or non-presence of a low-level signal.

The schematic of FIG. 3 depicts a system for sensing the change in an input signal above (more positive) or below (more negative) than a predetermined reference value. Such a system might be employed in the detection of low-level teletype signals where it is desirable to detect a change in line current from an "OFF" value to an "ON" value whenever the line current exceeds a preselected percentage of the "ON" amplitude; and to indicate a change in current from the "ON" value as it decreases toward its "OFF" value before the line current has decreased past a predetermined percentage of its "ON" value. For example, the circuit may be designed to give an output signal indication whenever an increasing line current exceeds 80% of its "ON" amplitude, and to give a second output signal whenever the line current decreases past 80% of "ON" amplitude going toward its "OFF" value.

As depicted in FIG. 3 the input signal to be monitored is fed in common to two differential detector circuits. The upper circuit is identical to that of FIG. 2 and functions to give an output signal whenever the input is more positive than the reference value. The lower portion of FIG. 3 is a detector circuit which has been adapted from that depicted in FIG. 2, to generate an output voltage level indicative of an input signal which is more negative than the reference potential. In this latter circuit positive feedback is provided from the collector of transistor 40' to the base of transistor 10' by way of resistor 51'. Diodes 52', 62' and 72' are analogous to diodes 52, 62 and 72 of FIG. 2 and perform similar functions.

When the circuit is in a quiescent state, that is, not detecting, transistors 10' and 20' are ON. At this time the reference potential $E'_{ref}$ is more negative than the input signal and the base currents of transistors 10 and 20 flow respectively through diodes 62' and 52' to the $E'_{ref}$ source. As the input signal becomes slightly negative with respect to the reference, diode 72' becomes forward-biased and base current of transistor 10 tends to flow into the input signal source 55'. This condition results in the increased conduction of transistor 10' and the emitter electrode thereof follows this negative-going input signal. This negative-going potential appearing also on the emitter of transistor 20 causes a diminution of the collector current flow in transistor 20 since the base of transistor 20 is held substantially to the amplitude of the $E'_{ref}$ source. The increased conduction of transistor 10 and the corresponding decreased conduction of transistor 20' results in the forward-biasing of transistor 30'. The voltage on the collector of transistor 40', which is the detector output voltage, begins to go negative. This negative potential is fed back to the base of transistor 10' via resistor 51' where it acts to further increase the conduction of the transistor 10', and also the forward bias on transistor 30'. The over-all effect of this positive feedback is the accelerated saturation of transistor 40' and the consequent distinct output voltage level of the detector circuit indicating that the input signal has become more negative than the reference potential. Eventually, with an increasingly negative input signal transistor 20' will become back-biased and will cease conduction. However as in the operation of the circuit of FIG. 2 the detector has already provided an output signal during the period when both transistors 10 and 20 were in a conducting state.

Thus in the application of the differential detectors to low-level teletype signals, the teletype line current provides the common input signals for the detector of FIG. 3. It will be assumed when detecting changes in line current from zero to a predetermined nominal value, that the sensing circuit should not give an output indicative of an "ON" condition, unless the current in the line exceeds 80% of the nominal value. Thus the amplitude of the reference potential $E_{ref}$ of the upper detector in FIG. 3 would be chosen to be substantially 80% of the nominal value. When the amplitude of the line current rises from zero to a value slightly more positive than $E_{ref}$, a negative detector output level will be generated as previously explained. This output is coupled to a utilization device 65'.

Also, it will be assumed that in sensing the line current transition from its nominal value toward zero, the detector should indicate this change before the line current decreases past 80% of its nominal value. Thus the amplitude of the reference potential $E'_{ref}$ of the lower detector of FIG. 3 would be set to substantially 80% of the nominal value. When the line current decreases to a value which is slightly negative with respect to $E'_{ref}$, a negative output level indicative of the current "OFF" condition will be generated by the lower detector. This ouput is also coupled to the same utilization device 65'. From the foregoing consideration of the illustrative embodiments of the present invention, it is readily apparent that the configurations of solid state electronic components depicted therein result in the precise, sensitive, high-speed detection of electrical signals. Other modifications of the circuits depicted herein, adapted to fit particular operating requirements, will be apparent to those skilled in the art. Consequently, the invention is not considered limited to the embodiments chosen for purposes of disclosure, but covers instead all changes and modifications which do not constitute departures from the true spirit and scope of this invention. Accordingly, all such variations as are in accord with the principles discussed previously are meant to fall within the scope of the appended claims.

What is claimed is:

1. A differential detector comprising in combination first, second and third current amplifying devices, each of said devices comprising an input, an output and a common electrode means for connecting the input electrode of said first amplifying device to a source of input signals, means for connecting the input electrode of said second amplifying device to a reference potential, individual impedance means for connecting the output electrode of each of said first and second amplifying devices to a source of bias potential, circuit means operatively connecting the common electrodes of said first and second amplifying devices to each other in a manner whereby a change in the degree of conduction of said first amplifying device results in an inverse change in the degree of conduction of said second amplifying device, the respective degrees of conduction of said first and second amplifying devices being a function of the relative amplitudes of said input signal and said reference potential, the input electrode and the common electrode of said third amplifying device being operatively connected respectively to the output electrodes of said first and second amplifying devices, said third amplifying device being responsive to the respective degrees of conduction and corresponding output voltages appearing on the output electrodes and being developed across said individual impedance means of said first and second amplifying devices and being biased by the combination of said output voltages to either a conducting or a non-conducting state, said third amplifying device being driven from one of said states of conduction to the other state in response to the occurrence of a predetermined amplitude relationship of said input signal to said reference potential, the voltage change appearing on the output electrode of said third amplifying device when said last device is driven from one of said states of conduction to the other state being indicative of the occurrence of said predetermined amplitude relationship.

2. A differential detector comprising in combination, first and second current amplifying devices, each of said devices having a plurality of electrodes, means connecting in common one of said electrodes of each of said first and second amplifying devices, means for connecting a second electrode of said first amplifying device to a source of input signals, means for connecting a second electrode of said second amplifying device to a reference potential, individual impedance means for connecting a third electrode of each of said first and second amplifying devices to a source of bias potential, a third current amplifying device having at least three electrodes, a pair of said electrodes of said third amplifying device being connected respectively to said third electrodes of said first and second amplifying devices, the respective degrees of conduction of said first and second amplifying devices being a function of the relative amplitudes of said input signal and said reference potential, a change in the degree of conduction of said first amplifying device resulting in an inverse change in the degree of conduction of said second amplifying device, said third amplifying device being biased to either a conducting or a nonconducting state in response to the relative degrees of conduction and corresponding voltages appearing on said third electrodes and being developed across said individual impedance means of said first and second amplifying devices, said third amplifying device being driven from one of said states of conduction to the other state in response to the occurrence of a predetermined amplitude relationship of said input signal to said reference potential, and circuit means including said third amplifying device for generating a detector output voltage which appears on a third electrode of said third amplifying device and is indicative of the occurrence of said predetermined relationship.

3. A differential detector comprising in combination first, second and third current amplifying devices, each of said devices having a plurality of electrodes, means connecting in common a first electrode of each of said first and second amplifying devices, means for connecting a second electrode of said first amplifying device to a source of input signals, means for connecting a second electrode of said second amplifying device to a reference potential, a parallel network coupling a third electrode of each of said first and second amplifying devices to each other, said parallel network comprising a unidirectional current device shunted by the current path between a first and a second electrode of said third amplifying device, a fourth current amplifying device having at least a pair of electrodes, means connecting a first of said electrodes of said fourth amplifying device to a third electrode of said third amplifying device, and utilization means connected to a second electrode of said fourth amplifying device.

4. A detector circuit as defined in claim 3 characterized in that said first, second and third current amplifying devices are transistors of the same conductivity type and said fourth current amplifying device is a transistor of a conductivity type opposite to that of said other transistor.

5. A differential detector comprising in combination first, second and third transistors, each of said transistors having an emitter, a collector and a base electrode, means connecting in common the respective emitter electrodes of said first and second transistors, means for connecting said common emitter electrodes to a source of bias potential, means for connecting the base electrode of said first transistor to a source of input signals, means for connecting the base electrode of said second transistor to a reference potential, means for connecting the collector electrodes of said first and second transistors respectively to a source of bias potential, a parallel network coupling the respective collector electrodes of said first and second transistors to each other, said parallel network comprising a diode shunted by the base-to-emitter junction of said third transistor, said diode being poled to limit the back voltage across the base-to-emitter junction of said third transistor, means for connecting the collector electrode of said third transistor to a source of bias potential, a fourth transistor having an emitter, a collector and a base electrode, means for connecting the emitter electrode of said fourth transistor to a source of bias potential, means coupling the base electrode of said fourth transistor to the collector electrode of said third transistor, means for connecting the collector electrode of said fourth transistor to a source of bias potential, the output voltage of said detector circuit appearing on the collector electrode of said fourth transistor, and means for coupling said output voltage to a utilization device.

6. A differential detector as defined in claim 5 for detecting input signals having a positive polarity with respect to said reference potential including impedance means connecting the collector electrode of said fourth transistor to the base electrode of said second transistor for providing the positive feedback of said detector output voltage.

7. A differential detector as defined in claim 5 for detecting input signals having a negative polarity with respect to said reference potential including impedance means connecting the collector electrode of said fourth transistor to the base electrode of said first transistor for providing the positive feedback of said detector output voltage.

8. A differential detector for detecting input signals which have a positive polarity with respect to a reference potential comprising in combination first, second and third PNP junction transistors, each of said transistors having an emitter, a collector and a base electrode, means connecting in common the respective emitter electrodes of said first and second transistors, means for connecting said common emitter electrodes to a source of bias potential, a first diode for connecting the base electrode of said first transistor to a source of input signals, said first diode being poled to offer low impedance to the flow of the first transistor base current therethrough, a second diode for connecting the base electrode of said second transistor to said source of input signals, said second diode being poled to offer low impedance to the flow of the second transistor base current therethrough in response to input signals having a negative polarity with respect to said reference potential, a third diode for connecting the base electrode of said second transistor to said reference potential, said third diode being poled to offer low impedance to the flow of the second transistor base current therethrough in response to input signals having a positive polarity with respect to said reference potential, means for connecting the collector electrodes of said first and second transistors respectively to a source of bias potential, a parallel network coupling the respective collector electrodes of said first and second transistors to each other, said parallel network comprising a fourth diode shunted by the base-to-emitter junction of said third transistor, said fourth diode being poled to limit the back voltage across the base-to-emitter junction of said third transistor, means for connecting the collector electrode of said third transistor to a source of bias potential, a fourth NPN junction transistor having an emitter, a collector and a base electrode, means for connecting the emitter electrode of said fourth transistor to a source of bias potential, means coupling the base electrode of said fourth transistor to the collector electrode of said third transistor, means for connecting the collector electrode of said fourth transistor to a source of bias potential, the output voltage of said detector circuit appearing on the collector electrode of said fourth transistor, a fifth diode for clamping said output voltage to a predetermined level, and means for coupling said output voltage to a utilization device.

9. A differential detector as defined in claim 8 including a positive feedback path comprising a resistive element connecting the collector electrode of said fourth transistor to the base electrode of said second transistor.

10. A differential detector for detecting input signals having a negative polarity with respect to a reference potential comprising in combination, first, second and third PNP junction transistors, each of said transistors having an emitter, a collector and a base electrode, means connecting in common the respective emitter electrodes of said first and second transistors, means for connecting said common emitter electrodes to a source of bias potential, a first diode for connecting the base electrode of said first transistor to a source of input signals, said first diode being poled to offer low impedance to the flow of the first transistor base current therethrough in response to input signals having a negative polarity with respect to said reference potential, a second diode for connecting the base electrode of said first transistor to said reference potential, said second diode being poled to offer low impedance to the flow of the first transistor base current therethrough in response to input signals having a positive polarity with respect to said reference potential, a third diode for connecting the base electrode of said second transistor to said reference potential, said third diode being poled to offer low impedance to the flow of the second transistor base current therethrough, means for connecting the collector electrodes of said first and second transistors respectively to a source of bias potential, a parallel network coupling the respective collector electrodes of said first and second transistors to each other, said parallel network comprising a fourth diode shunted by the base-to-emitter junction of said third transistor, said fourth diode being poled to limit the back voltage across the base-to-emitter junction of said third transistor, means for connecting the collector electrode of said third transistor to a source of bias potential, a fourth NPN junction transistor having an emitter, a collector and a base electrode, means for connecting the emitter electrode of said fourth transistor to a source of bias potential, means coupling the base electrode of said fourth transistor to the collector electrode of said third transistor, means for connecting the collector electrode of said fourth transistor to a source of bias potential, the output voltage of said detector circuit appearing on the collector electrode of said fourth transistor, a fifth diode for clamping said output voltage to a predetermined level, and means for coupling said output voltage to a utilization device.

11. A differential detector as defined in claim 10 including a positive feedback path comprising a resistive element connecting the collector electrode of said fourth transistor to the base electrode of said first transistor.

References Cited in the file of this patent

UNITED STATES PATENTS

| | | |
|---|---|---|
| 2,666,816 | Hunter | Jan. 19, 1954 |
| 2,879,409 | Holt | Mar. 24, 1959 |
| 2,949,546 | McVey | Aug. 16, 1960 |
| 2,997,659 | Abbott et al. | Aug. 22, 1961 |
| 3,054,910 | Bothwell | Sept. 18, 1962 |
| 3,076,135 | Farnsworth et al. | Jan. 29, 1963 |